Figure 1:
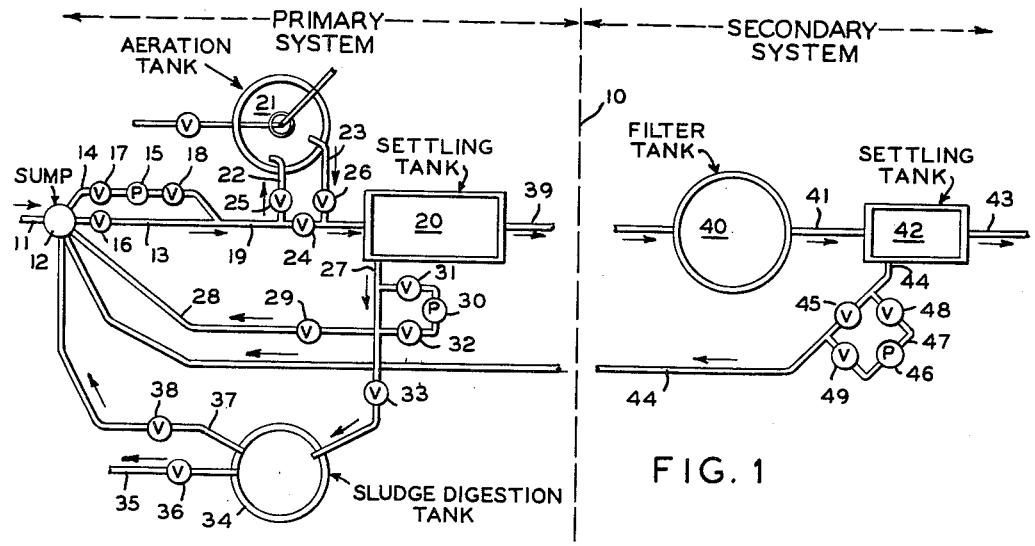

Nov. 30, 1965     J. M. VALDESPINO     3,220,706
SEWAGE TREATMENT SYSTEM
Filed June 7, 1963     4 Sheets-Sheet 1

INVENTOR
JOE M. VALDESPINO
BY
ATTORNEYS

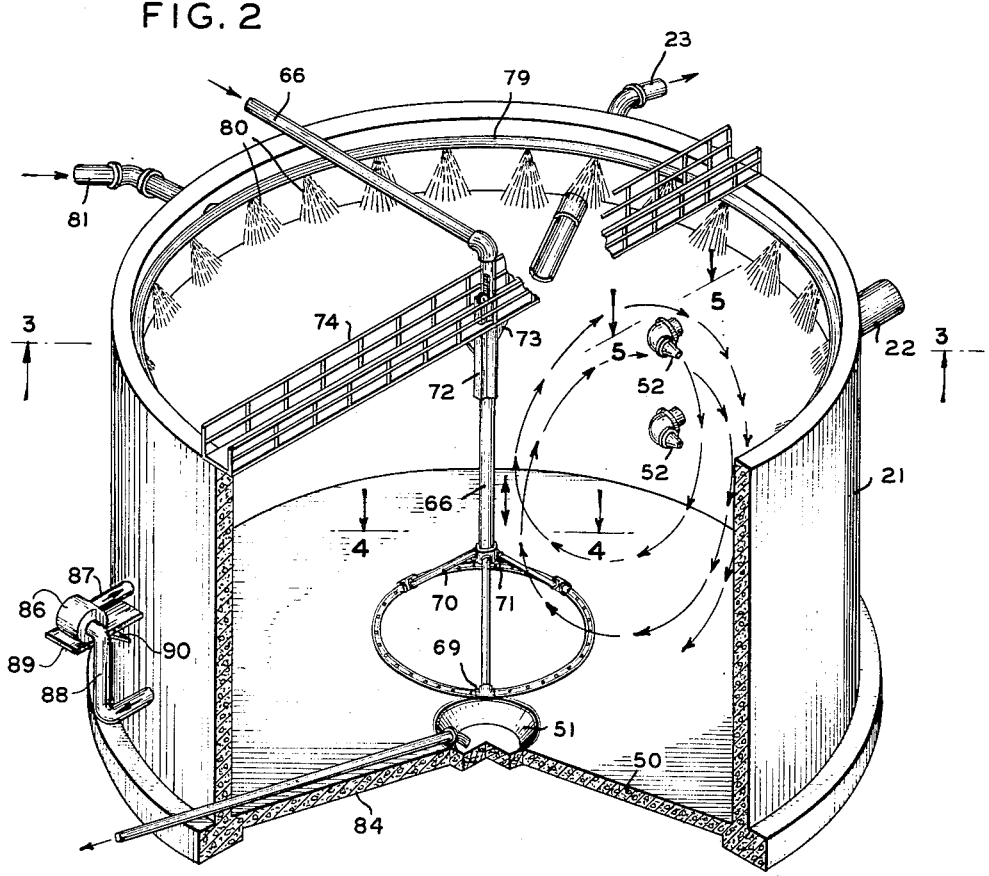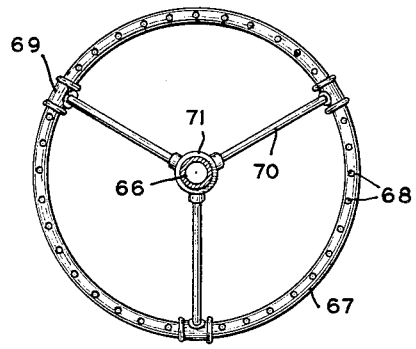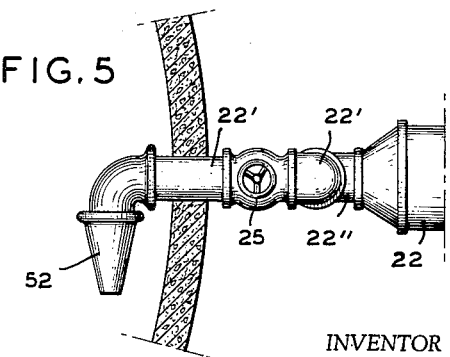

Nov. 30, 1965   J. M. VALDESPINO   3,220,706
SEWAGE TREATMENT SYSTEM
Filed June 7, 1963   4 Sheets-Sheet 3

INVENTOR
JOE M. VALDESPINO
BY
ATTORNEYS

Nov. 30, 1965   J. M. VALDESPINO   3,220,706
SEWAGE TREATMENT SYSTEM
Filed June 7, 1963   4 Sheets-Sheet 4

INVENTOR
JOE M. VALDESPINO

BY *H. Gates Dowell III*
ATTORNEYS

3,220,706
SEWAGE TREATMENT SYSTEM
Joe M. Valdespino, Orlando, Fla., assignor to Pacific Flush Tank Company, Chicago, Ill., a corporation of Illinois
Filed June 7, 1963, Ser. No. 286,384
5 Claims. (Cl. 261—18)

This invention relates to the treatment of sewage in the form of liquid carried waste of human or industrial origin or both, and involves the removal of settleable, suspended, dissolved and finely dispersed matter, such treatment being designed to removed organic matter and to obtain the benefits therefrom including the elimination of nuisance on the order of odors, color, turbidity and the like, as well as the simplification of the process of disinfecting disease bacteria where such is desirable or necessary.

The invention relates particularly to a sewage treatment system of multiple units which collectively remove the pollutional material in successive steps and also relates to the particular character of one of the units in which aeration is accomplished for converting complex organic compounds and the like to a form of less objectionable character and which may more readily be removed from the body of the liquid.

Heretofore it has been customary to separate the steps of grit removal, preaeration in case the raw sewage is septic, sedimentation, and aeration. The present invention relates to a structure and operating procedure combining all four of these steps in one unit. It has been found that the combination of these steps carried in one structure increases the efficiency over what was obtained by utilizing these steps separately.

It is an object of the invention to provide a sewage disposal system including an aeration tank unit of a much greater efficiency than anything heretofore produced, of relatively small size, at reasonable cost, and by means of which raw sewage may be treated in a manner to reduce its organic content to a relatively small amount in a minimum of time, and to accommodate fluctuations in the amount treated while providing for a constant discharge for leveling off of peak flow to insure desirably uniform subsequent flow through succeeding units.

Another object of the invention is to provide a sewage treatment plant having a circular tank or unit with a bottom inclined downwardly from its outer wall to its central portion, and means for introducing sewage into the tank in a manner to simplify the removal of organic matter by the introduction of a highly efficient novel procedure which can be accomplished more conveniently by simple structural modifications of existing sewage treatment plants, and which can be applied either to produce a higher degree of purification or a lesser degree when relief of the load on subsequent treatment units is required or desired.

A further object of the invention is to provide a tank of the above character in which an air header is adjustably mounted for raising and lowering movement to obtain the maximum efficiency of operation in view of the nature and character of the sewage treated, the volume, and the rapid exposure of the entire contents of the tank to the atmosphere and the oxygen therein to obtain maximum aeration.

A further object of the invention is to provide a sewage treatment system of the character indicated including a unit in the form of a circular tank with a bottom inclined to a central sump or cavity and into which tank sewage will be introduced through one or more variable size nozzles disposed tangentially to cause swirling or rotating action within the tank and with an air header having a series of discharge orifices and with means for mounting such ring for vertical adjustment and for supplying air through such orifices to cause movement of the contents of the tank upwardly, outwardly, downwardly and inwardly.

A still further object of the invention is to provide a sewage treatment tank of a character to have an unoccupied area in its upper portion to accommodate variations in capacity or volume and with a liquid spray ring with downwardly directed jet orifices for the discharge of jets or sprays of water onto the upper surface of the rotating, rolling and spiralling mass within the tank for reducing bubble and froth.

Figure 3:
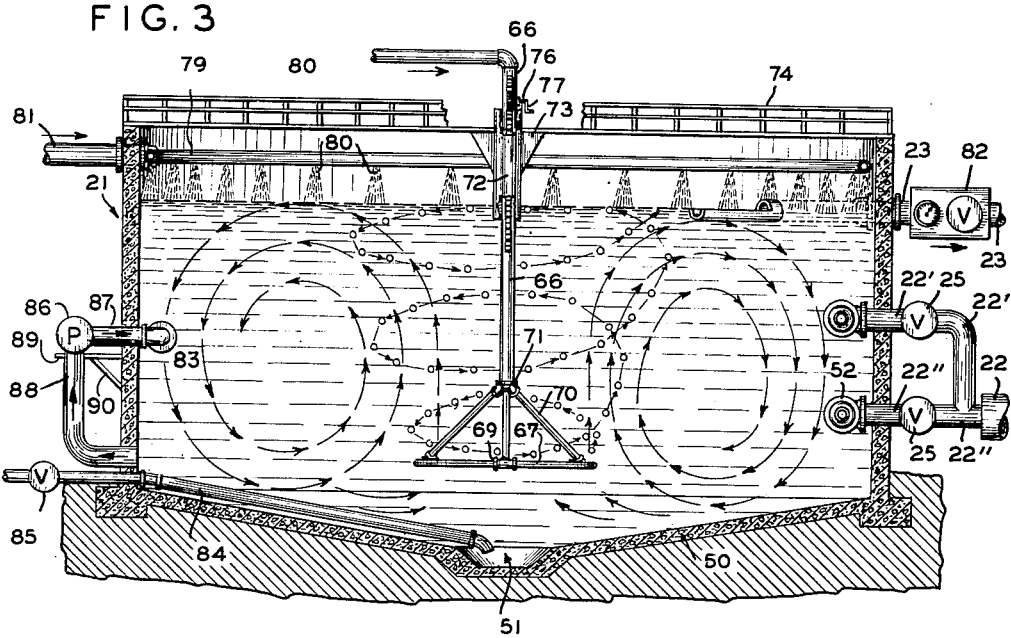
Figures 6, 7:
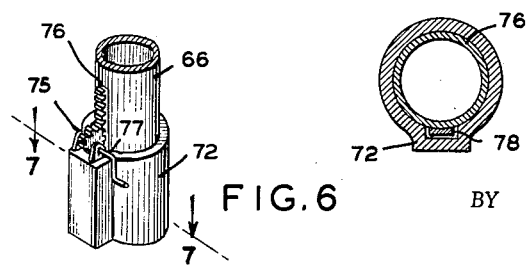
Figure 8:
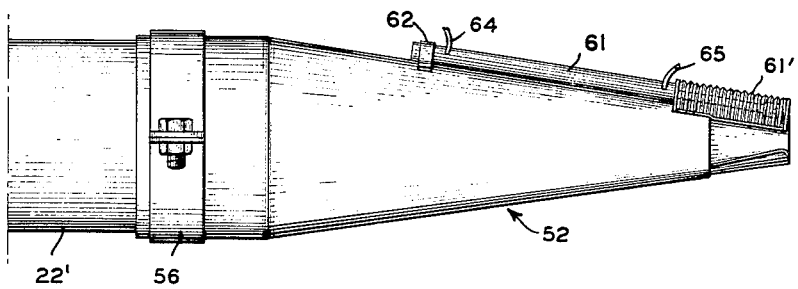
Figure 9:
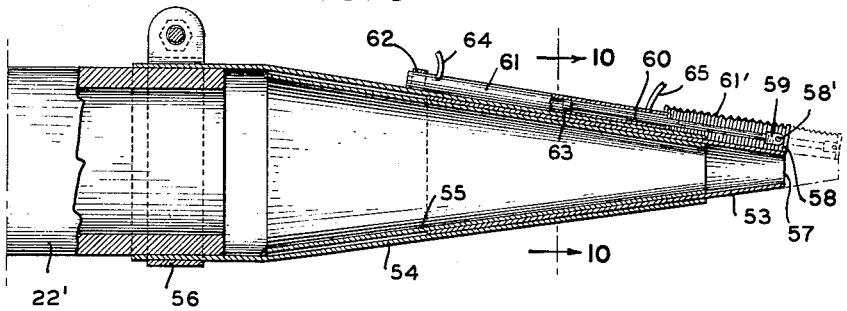
Figure 11:
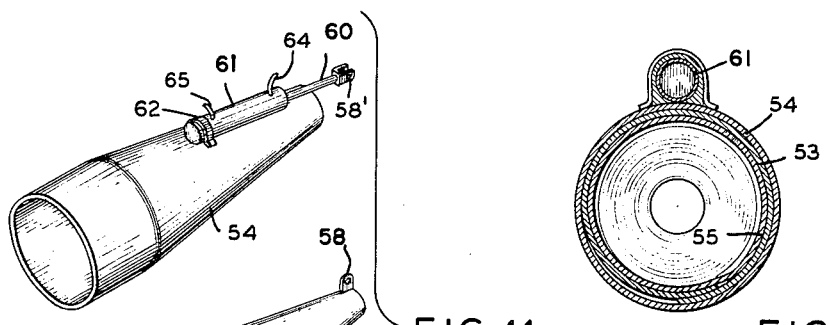
Figure 10:
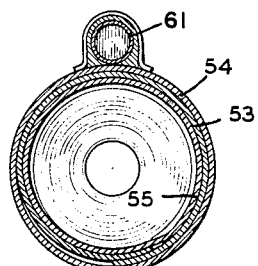
Figure 12:
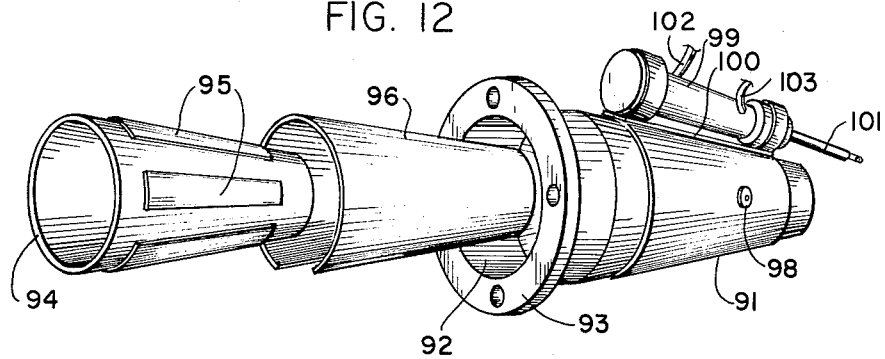
Figure 13:
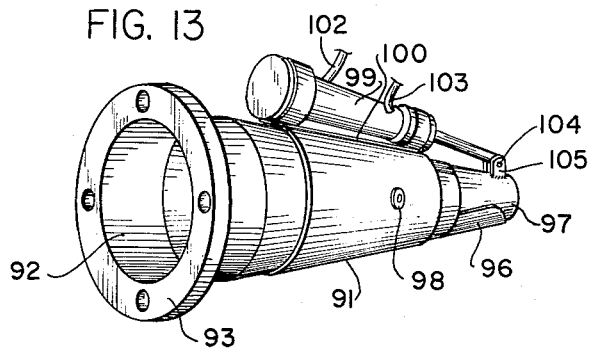

Other objects and advantages of the invention will be apparent from the following description taken in conjunction with the accompanying drawings in which:

FIG. 1 is a diagrammatic view or layout of a sewage disposal system in accordance with the present invention;

FIG. 2, a perspective of an aeration tank unit with parts broken away for clarity;

FIG. 3, a vertical section through the aeration tank unit on the line 3—3 of FIG. 2;

FIG. 4, an enlarged horizontal section on the line 4—4 of FIG. 2;

FIG. 5, an enlarged fragmentary detail illustrating the tangential inlet nozzle on the line 5—5 of FIG. 2;

FIG. 6, an enlarged fragmentary detail perspective of the aeration unit elevational adjustment mechanism;

FIG. 7, a horizontal section on the line 7—7 of FIG. 6;

FIG. 8, an enlarged side elevation of an adjustable flow tangential inlet nozzle;

FIG. 9, a longitudinal section of the structure of FIG. 8;

FIG. 10, a transverse section thereof on the line 10—10 of FIG. 9;

FIG. 11, an exploded view of the three essential parts of the nozzle;

FIG. 12, an exploded perspective of another type of variable flow nozzle composed of relatively fixed outer and inner cones and a split intermediate cone;

FIG. 13, a perspective of the parts of FIG. 12 in assembled relation; and

Figure 14:
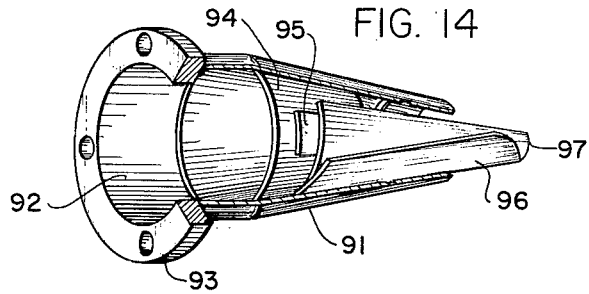

FIG. 14, a perspective section of the nozzle with parts eliminated.

Briefly stated, the present invention is a sewage treatment system of multiple units including a well or sump, aeration, settling, digestion, filtering and the like tanks, interconnected with means for introducing sewage to be treated and producing flow under controlled conditions in the system, and with the flow arranged so that certain of the units of the system can be bypassed when desired and especially when not needed. An important part of the system is a circular aeration unit or tank into which sewage is admitted from a large conduit through one or more smaller pipes having variable size nozzles and located generally tangentially of the outer wall or circumference within the tank and spaced from, but near, the bottom so that rotation of fluid within the tank by the inflow of additional fluid or by other means may be accomplished, an aeration ring or header being provided through which air discharged exerts an upward and generally radial force on such fluid and such header being mounted in a manner to provide for vertical adjustment along the vertical center line of the tank near the bottom, whereby rotative force of the mass and the velocity of the air introduced will cause rolling, swirling motion which produces a mechanical reduction and digestion of solids and an intimate subjection of the entire body within the tank to the oxygen of aerating air, the heavier particles of sand being thrown out in the bottom center of the tank beneath the air header during the operation of the system, and such tank having a normally unoccupied area or freeboard to accommodate variations in influent material while discharging a controlled substantially uniform volume of treated matter or effluent material. If desired a water ring having spray orifices along the underside may be provided around the upper interior wall portion of the tank through which orifices water can be sprayed onto the rolling, swirling mass to reduce frothing and collection of air bubbles.

Alternately, where introduction of sewage lacks sufficient force to produce circular movement within the aeration tank, means may be provided for causing such movement. As an example, a pump having its intake pipe communicating with the tank above the bottom thereof and with a line in communication with the discharge of the pump into the upper portion but below the normal liquid level of the tank and with a tangential nozzle as illustrated in FIG. 3. It will be apparent that due to the fact that the liquid level of the tank extends above the level of the pump minimum force will be required to produce circulation. Also, it will be apparent that the pump may be of any preferred form and if desired it may be mounted on a shelf and supported by a bracket.

With continued reference to the drawings, the present invention involves a primary treatment system P and a secondary treatment S. As illustrated in FIG. 1, these systems are separated by a vertical dotted line 10 and the following description will be directed first to the treatment units which comprise the primary system and then to the treatment units which comprise the secondary system.

Raw sewage under proper impetus or hydraulic head produced by gravity, by pump, or in any convenient manner is directed through a line 11 at the extreme left of FIG. 1 into a collecting well or sump 12. Removal of the sewage from such sump may be accomplished through a pipe or gravity line 13, or a line 14 containing a pump 15 or a combination of both. The gravity line 13 is subject to the control of a valve 16 and the line 14 supplies the pump 15 under the influence of valves 17 and 18. The lines 13 and 14 converge into a line 19 leading to a primary settling tank 20.

An aeration unit including a tank 21 may be used in the line 19 to produce additional aeration or contact between oxygen and the sewage, a line 22 being interposed to conduct sewage to the aeration tank 21 and a discharge line 23 from the aeration tank to the line 19. The flow of sewage to the tank 20 is under the control of valves 24, 25, 26 whereby when the valve 24 is open and valves 25 and 26 are closed flow will be directed to the primary settling tank 20, but when valve 24 is closed and valves 25 and 26 are open flow will be directed through the aeration tank 21 and then to the primary settling tank 20.

Sludge solids settled in the primary settling tank 20 pass out or are withdrawn through the line 27 either by gravity, directly into the line 28 subject to the control of a valve 29, or by a pump 30 subject to valves 31 and 32. The primary sludge which passes through the line 28 is directed to the collecting well or sump 12 for reprocessing.

Periodically sludge from the system will pass either by gravity or be pumped through the line 27 under the control of a valve 33 to a sludge digesting tank 34. The digested sludge withdrawn from this tank will pass through the line 35 to a point of disposal subject to a control valve 36. At the same time excess digested liquid will pass through the line 37 to the collecting well or sump 12 subject to the control of a valve 38.

Where a secondary treatment system is provided in addition to the primary system, the effluent or discharge from the primary settling tank 20 will pass through a line 39 into a secondary treatment unit in the form of a trickling filter or activated sludge tank 40 with the effluent leaving such unit through a line 41 and passing through a final settling tank 42 where any additional solids settle therein and the effluent passes out through the effluent line 43. The settled solids are drawn from the final settling tank 42 through line 44 subject to a control valve 45 by the action of gravity or, if desired, a pump 46 may be employed in a line 47 subject to control valves 48 and 49, the line 44 carrying the secondary sludge to the collecting well or sump 12.

The aeration unit (FIGS. 2 and 3) comprises a tank 21 having a bottom wall 50 inclined upwardly from a central discharge sump 51 to the outer wall or circumference of the tank. The line 22 extends to the tank and has branches 22' and 22" subject to the control valves 25. The branches 22' and 22" terminate in tangential nozzles 52 (FIGS. 5 and 8–11), the angle of the discharge from which causes the contents of the tank to rotate. Since the cross-sectional areas of the openings through the tangential inlet nozzles 52 are smaller than that of the line 22 flow through such nozzles will be at a greater velocity than through the line 22 and will produce the necessary rotation of the contents of the tank. By the use of adjustable and multiple nozzles 52 the amount of sewage introduced as well as the fluid pressure may be varied and controlled and if desired one tangential nozzle 52 may be rendered inactive for any desired purpose.

Either of the nozzles 52 may be of adjustable size in order to vary the volume discharged at whatever velocity preferred. Each nozzle (FIGS. 8–11) may be formed of a coiled split sheet or cone 53 slidably mounted between outer and inner conical members 54 and 55, the latter being fastened together by welding or in any other desired manner. The nozzles may be attached to the lines 22' and 22" by having the outer conical member 54 provided with a clamping ring 56 which serves to attach the nozzles to such lines.

The conical members 54 and 55 have their walls disposed at substantially the same angle for easy sliding movement of the cone 53 to control the size of the discharge orifice 57. In order to move the member 53 axially to vary the size of such discharge orifice such member is provided with a lug 58 connected by a pivot 58' to a yoke or bifurcated end 59 of piston rod 60 which extends into a hydraulic cylinder 61 having its remote end fastened by a bracket 62 to the outer conical member 54. The piston rod 60 engages a piston 63 within the cylinder and by selectively introducing pressure fluid through lines 64 and 65 the reciprocation of the member 53 can be accomplished. The invention is not limited to the use of a hydraulic cylinder as any other desired means can be employed for moving the member axially. Sewage is excluded from the piston by a metal bellows 61'.

In order to introduce oxygen-containing air for aeration purposes to the sewage being treated in the tank, an air tube or line 66 (FIGS. 2, 3 and 4) is provided through which air is supplied to a ring or header 67 and therefrom through air discharge orifices 68. In a preferred application the rate of air delivery was 0.3 cubic foot per gallon of sewage or 310 cubic feet of air per pound of biological oxygen demand of the material introduced into the raw feed to the tank.

As illustrated, the header 67 is composed of three sections joined by coupling members 69 and three connecting members 70 to a coupling 71 attached to the lower extremity of the pipe 66 so that air under pressure may be discharged from the pipe 66 through the orifices 68 in the header 67 and with the rotational force of the material in the tank will produce a predetermined circulatory pattern and turbulence of the fluid in the tank 21. It is noted that the air header may be of any desired configuration having orifices 68 disposed substantially an equal distance from the outer wall of the tank.

The air discharge header 67 is submerged preferably centrally near the bottom of the tank and below the level of the inlet nozzles 52. The nozzles 52 are located at a level below the discharge or overflow pipe and the latter is located in downwardly spaced relation from the top of the tank to allow for excess volume or a certain amount of freeboard within the upper portion of the tank.

The air discharge header 67 is vertically adjustable (FIGS. 2, 3, 6 and 7) and is slidable in a mounting sleeve 72 fastened by gussets 73 to a bridge or catwalk 74. The mounting sleeve has attached thereto a pinion 75 fixed to a shaft 76 having a crank 77 by means of which the pinion may be rotated and a rack 78 on the inlet pipe 66 caused to move with the pipe and thus be raised and lowered, as desired.

A water or other liquid spray ring 79 (FIGS. 2 and 3) may be located around the interior of the inner wall of the tank and have orifices 80 for the discharge of jets of water or other liquid from a pipe 81 with such spray utilized to reduce air bubbles and froth.

In operation raw sewage is introduced into the system through the pipe 11 (FIG. 1) and into the aeration unit or tank 21 from the pipe 19 at the desired pressure through one or more nozzles 52 located at one or more elevations or levels below that of the overflow and through which the direction of flow of the discharge is tangential to the circumference of the tank. This flow overcomes the inertial mass of the liquid in the tank and produces a circular velocity around the inner periphery of the tank.

The outlet or discharge from the tank is accomplished by a pipe or conduit 23 at a predetermined elevation and provided with a metering valve 82. The tank 21 is of sufficient size to accommodate a maximum amount or mass of matter to be treated and a substantially smaller volume treated in normal operation so that fluctuations in the inflow can be readily accommodated while the discharge is maintained constant for uniform flow to subsequent units of the system for better control.

The air header utilized in the aeration of the contents of the tank may be of varying designs and with outlet orifices of any desired character spaced to obtain the desired distribution of the air around the periphery of the air header located centrally and concentrically in the tank and to provide a substantially uniform spacing between the orifices of the header and the peripheral wall of the tank in which the header is located. The adjustable elevation and location of the header allows space for the accumulation of grit in the bottom center portion of the tank beneath the air header and also produces the proper roll of the liquids in the tank from beneath, upwardly, through and above the air header.

In the preferred design as indicated above, the air header is adjustably mounted so that it may be raised or lowered for desired air delivery and maximum efficiency of operation. The combined effect of the upward velocity produced by the air simultaneously with the circular movement of the tank's liquid by the tangential entry of the liquid into the tank effected by the arrangement of the inlet nozzles results in an upward spiralling motion of the liquid and air and eliminates the possibility of short-circuiting or incomplete mixing of the air and sewage. This action affords a rapid exposure of the surface of solid matter in the tank for increased absorption of atmospheric oxygen through violent contact and an increased rate of solution by the liquid of the oxygen applied in the compressed air. Thus the longer path of the air due to the upward spiralling motion aids in the distribution and the solution of the compressed air, which where viewed from the top of the tank appears as a series of air turbulences affording optimum integration of the air and the liquid due to the movement of the material from the center to the circumference of the circular tank, then down along such circumferential wall, along the floor to the center, and again upwardly under the air header. The tank's contents repeatedly are subjected to rolling and spiralling motion and the air emerging from the air header is met at a sharp angle and consequently is sheared by the flow of the turbulent liquid rolling and spiralling past the orifices of the aerating system and which does not have to achieve any specific bubble size before leaving the system.

The space beneath the air header and the floor is such that grit is readily accumulated at this location only the flow being such as to prevent the accumulation of grit elsewhere than in the center or sump area. Likewise, the continual washing effect of the turbulent spiralling and rolling liquid results in a grit free from organic solid constituents. It has been found that the removal of minute particles of sand, sometimes referred to as "sugar sand," and grit is readily accomplished through the action which takes place within the tank. Any convenient means may be provided for the removal of the accumulated grit such as, for example, by a discharge pipe 84, chute, orifice or other means controlled by a valve 85.

Alternately, where introduction of sewage lacks directional force sufficient to produce movement within the aeration tank 21 means may be provided for causing movement such as, for example, a pump 86 having its discharge communicating with a pipe 87 or with the tank near its upper portion but below the normal liquid level and with a line 88 in communication with the suction of the pump from the lower portion of the tank as illustrated in FIGS. 2 and 3. The discharge line 87 is provided with an adjustable nozzle 83 arranged in tangential relation with the circumference of the tank in the same manner as the inlet lines 22' and 22". It will be apparent that due to the fact that the liquid level of the tank extends above the level of the pump 86 minimum force will be required to produce circulation. Also, it will be apparent that the pump may be of any preferred form and if desired it may be mounted on a shelf 89 and supported by a bracket 90.

By the use of applicant's invention as one of the units of the system, the operations of the other units of the system are improved. These improvements have been observed in a full size operating plant known as the Orange County, Florida Southwest Sewer District. Among the ways in which this improvement is manifest is:

(1) The particle size of the solids is increased through flocculation, thereby simultaneously increasing the specific gravity and resulting in a more rapid settling in the first unit immediately following the aeration tank.

(2) The recycling of this floc to the aeration tank and mixing with the incoming raw sewage presents greater surface for adherence of the colloidal or suspended material present in the liquid which ordinarily would not otherwise be affected by conventional primary settling processes.

(3) The oxidation of the organic solids under the aerobic conditions provided in the aeration tank reduces, through the aforementioned bacterial activity, the volume of the solid constituents normally present in the primary overflow, thereby reducing simultaneously the organic load applied to the trickling filters and the solids load on the anaerobic sludge digesting tanks.

(4) The introduction of air to the incoming sewage reduces or eliminates the septicity of the material and provides for the aerobic decomposition of the organic material present, thereby reducing or eliminating the odoriferous sulphides which otherwise would be generated due to the deficiency of oxygen under generally conventional conditions.

(5) The aerobic process accelerates the progression of nitrification ($NH_3$—$NO_3$), thereby gaining stability of the material much more rapidly than under conventional methods.

(6) The character of the sewage in the units immediately following the aeration tank is improved in that dissolved oxygen is present therein, and obnoxious odors generally observed through these units are absent.

(7) The material ordinarily returned from the secondary clarifiers as humus is almost totally eliminated, thereby making possible a much clearer recirculation to the incoming sewage if such is required.

(8) Owing to the tremendous efficiency attributed to the preceding aeration process, the discharging effluent from the secondary units to the lagoons or oxidation ponds or other receiving bodies of water including streams contains less organic nutrients and as a result leaves less to sustain and consequently reduces or eliminates certain growths on the order of algae or the like frequently experienced in these ponds after conventional processes. This consequently reduces the load on the receiving water courses by materially reducing the excessive generation of algae or similar growths, which, after passing through a normal growth cycle tend to die off and thereby become oxygen demanding pollution agents in the stream, lake or pond.

It will be apparent that the tank may be operated for the removal of grit alone or to remove the grit, as a pre-aeration device for oxidizing and removing odors. The influent or admitted substance consists of raw sewage in a septic condition having an immediate oxygen need and demand. In this case the detention and aeration time is merely long enough to satisfy the immediate demand and to add a substantial amount of dissolved oxygen to the solution. The submerged location of the inlet nozzle results in the discharge of the admitted sewage into an aerated zone in which the obnoxious septic odors are oxidized and consequently are not allowed to reach the surface where they would give an effluvia or be obnoxious and be considered a nuisance.

The discharge from the tank may be to any type of subsequent treatment equipment including a trickling filter. In the preferred application of the predescribed apparatus the discharge passes to a sedimentation basin which provides a sufficient retention of the material to allow the separation of the solid from the liquid material by gravity. The sediment or sludge accumulated is returned to a well to mix with incoming raw sewage and again be pumped to the apparatus. The discharge from the sedimentation basins then overflows into trickling filters or other filters for further treatment of any sediment subsequently settled in any other unit also being returned to the discharge well. As applied in certain existing installations, a relatively small amount of sludge resulted thereby indicating a relatively high degree of oxidation of the organic material.

When operated as an activated sludge tank the admitted substance consists of raw sewage with sludge returned as hereinafter described and the period of aeration and circulation is increased in accordance with the means to allow the formation of sludge by biological and chemical action. The discharge is then allowed to settle and the preformed sludge is returned to the substance to be treated.

A modified form of nozzle generally similar to that illustrated in FIGS. 8-11 is illustrated in FIGS. 12, 13 and 14 wherein a housing or outer member 91 is provided of cast steel or other material and of generally frusto-conical shape having an internal bore 92 and an attaching flange 93.

Within the housing or outer member 92 is welded or otherwise fixed a complementary inner generally frusto-conical member 94 having raised friction strips or runners 95. Between the housing 91 and the inner member 94 is disposed a split sheet 96 adapted to be moved endwise between the members 91 and 94 so that its exposed smaller end will define a nozzle opening 97 of variable size dependent upon the axial position of the sheet 96 relative to the members 91 and 94. A port 98 also may be provided through which lubricant can be injected to facilitate movement of the split sheet 96 within the member 91.

A fluid cylinder 99 is provided in order to move the split sheet 96 axially and within this cylinder 99 is a piston 100 having a piston rod or operating member 101 adapted to be reciprocated from a fluid source through lines 102 and 103. The operating member or piston rod 101 is connected by a pin 104 with a bifurcated projection 105 attached to the sheet 96. The variable nozzle is adapted to be attached by the flange 93 to a mating flange (not shown) on the pipe 22′ or 22″. The operation of the nozzle of FIGS. 12-14 is like the operation of that of FIGS. 8-11.

It will be apparent from the foregoing that the apparatus described may be utilized to augment existing treatment installations which may be overloaded hydraulically or organically or the original design may be utilized for new installations.

Although the system is of reduced size the unique action produced in the circular tank substantially reduces the volume and contact time previously considered necessary for the oxygenation of sewage. Another important result achieved through the action produced by the present equipment is the small size and capacity of compressed air equipment used in conjunction with sewage inflow simultaneously to produce the agitation of the material and obtain transfer of oxygen from a gaseous to a dissolved state. The effective, constant and complete contact of the liquid surface with the admitted air is an important factor in introducing dissolved oxygen into the liquid.

The performance of the present invention has been found to be exceptional. In a certain installation, efficiencies in the reduction of the biochemical oxygen demand has more than doubled. In fact, in one installation it has increased from 35 percent to near 90 percent in the settled primary effluent. In such installation efficiencies through succeeding trickling filters increased approximately from an average of about 72 percent to near 94 percent and through subsequent secondary setting from approximately 84 percent to near 97 percent. In this installation, which employs a design of the predescribed nature, the physical character of the effluent approached such a high degree of quality and clarity that at the secondary settling tanks there was an unusual depth of perception.

A plant constructed in 1957 included two circular digesters, each 45 feet in diameter with 20 foot side walls and having bottoms tapering to a central sump. These tanks were adapted to be filled within two to three feet of the top so there would be a two foot margin for excess matter, and this system was designed to handle one million gallons of sewage per day. In 1962, due to a large industrial plant having located in the area, the demand on the plant had more than doubled and it was believed that the plant would have to be doubled in size and it could not be handled without extensive costly expansion, money for which was not available.

Applicant conceived his invention and installed the same with the result that it brought many advantages which had not seemed possible including the elimination of odors, improvement in the clarity and quality of the discharge and enabled the plant to handle the increased load appreciably far in excess of that required or what was predicted or anticipated. Actually the capacity of the plant was increased approximately three and one-half times by a very inexpensive utilization of applicant's invention. The values derived from this combination tank in the removal of grit from the process employed at the installation has proved extremely beneficial as has the ability to accommodate peak flow which inbalance the hydraulics of the usual units normally employed for the treatment of the process if not otherwise controlled.

By way of summation, in addition to those above mentioned, some of the advantages of the present invention are:

(1) A reduction in tank volume requirements for the aeration process resulting initial construction savings, (2) A reduction in air delivery volume resulting in reduction in equipment expenditures, (3) A reduction in the brake horsepower requirements for the compression apparatus employed for the delivery of the air to the tank, (4) A reduction in power costs necessary for the operation of this type of installation, (5) A unique application for the efficient removal of grit, (6) A means to control the hydraulic application rate of a treatment works by use of the surge flow storage capacity available in the tank, (7) A tremendously increased improvement in quality of effluent in succeeding unit or units of treatment, (8) The multiple uses of the apparatus of the system,
   (a) The hydraulic action results in complete removal of grit including very fine "sugar sand," particles, and a washing action which removes organic matter effectively,
   (b) It may serve as a preaeration tank when handling septic raw sewage where the only requirement is the introduction of dissolved oxygen in excess of the septicity,
   (c) By longer detention time the tank may serve as a relatively high-rated active sludge aeration unit,
   (d) It provides a storage area above the normal overflow, hence allowing for withholding temporary excessive flow or in other words to serve as a surge tank, (9) The heretofore unaccomplished disintegration of latex or rubber products so conspicuous in other plants by the abrasive character of the internal tank wall, floor, and sand.

The invention therefore includes a multi-purpose tank and the desired results may be obtained individually or all of the facilities may be utilized simultaneously. Also, the rolling, spiralling motion of the liquid and air in the tank depends jointly on the force of the flow and subsequent velocity of the incoming liquid and the velocity and amount of applied air with a relative adjustment in the exact method and application of the two.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A sewage treatment system comprising in combination a series of interconnected treatment units including an aeration unit, said aerating unit including a generally circular tank for matter to be treated, at least one generally tangentially disposed adjustable size sewage inlet located along the interior wall of said circular tank through which matter to be treated is introduced into the tank in a manner to cause movement in a generally circular path, an overflow discharge line in said tank, a circulating pump having an inlet in communication with said tank and a tangential discharge into said tank for imparting motion to the contents of the tank, vertically adjustable air inlet means disposed in the lower mid portion but spaced from the bottom of said circular tank, and a liquid spray ring around the upper interior portion of the tank having downwardly directed orifices for the spray of liquid onto the liquid in said tank to reduce froth and bubbles in the tank, whereby sewage introduced through said tangential discharge will be caused to rotate and will be engaged by air from said air inlet means and caused to move generally at right angles to the first rotation thereby resulting in a rolling, swirling action of the sewage with intimate exposure to the oxygen of the air.

2. An aeration tank for an aerobic sewage treatment system, said tank comprising a relatively large generally cylindrical side wall and an inclined bottom terminating in a sump at a lower level, at least one sewage inlet line extending through said side wall, said line having an adjustable nozzle located generally tangentially to the inner periphery of said tank and substantially below the normal liquid level and through which matter to be treated is introduced into the tank in a manner to cause movement in a generally circular path, an air ring located generally centrally of said tank, means for introducing air under pressure through said air ring into said tank, means for adjusting said air ring along the vertical axis of said tank, said air ring normally being located in the lower portion of said tank and in spaced relation to said sump, whereby sewage introduced into said tank through said inlet line will move in a generally circular path and will be engaged by air from said air ring and caused to move in a generally radial path thereby resulting in a rolling swirling action of the sewage with intimate prolonged exposure to the oxygen of the air.

3. The structure of claim 2 including an auxiliary circulating pump having an inlet in communication with said tank adjacent the bottom thereof and a tangential discharge into said tank below the normal water level for imparting additional rotary motion to the contents of said tank.

4. The structure of claim 2 including a liquid spray ring mounted on the inner periphery of said tank above the normal water level, said spray ring having a plurality of spaced orifices, means for introducing liquid under pressure into said spring ring, whereby liquid from said spray ring will be directed onto the liquid in said tank to reduce froth and bubbles.

5. An aeration tank for an aerobic sewage treatment system comprising a relatively large generally cylindrical tank having a side wall and an inclined bottom terminating in a sump at a lower level, a sewage inlet line extending through said side wall, said line having a discharge located generally tangentially to the inner periphery of said tank through which matter to be treated is introduced into the tank in a manner to cause movement in a generally circular path, an air ring located generally along the vertical axis of said tank, means for introducing air under pressure through said air ring into said tank, means for adjusting said air ring along the vertical axis of said tank, whereby sewage introduced into said tank through said inlet line will move in a generally circular path and will be engaged by air from said air ring and caused to move in a generally radial path thereby resulting in a rolling swirling action of the sewage with intimate prolonged exposure to the oxygen of the air.

References Cited by the Examiner

UNITED STATES PATENTS

| | | | |
|---|---|---|---|
| 2,300,679 | 11/1942 | Klein | 239—455 |
| 2,425,932 | 8/1947 | Green et al. | 210—512 X |
| 2,438,342 | 3/1948 | Mallory | 210—14 |
| 2,786,025 | 3/1957 | Lamb et al. | 210—5 |
| 2,969,189 | 1/1961 | Jordan | 239—455 |
| 3,078,999 | 2/1963 | Kelly | 210—14 X |
| 3,133,878 | 5/1964 | Kober | 210—15 X |
| 3,152,982 | 10/1964 | Pagnotti | 210—15 X |

OTHER REFERENCES

Babbit: Sewerage and Sewage Treatment, sixth ed., 1947, John Wiley, New York, pp. 418, 422 and 423.

Infilco—The Aero-Accelator, a publication of Infilco, Inc., Tucson, Ariz., Bulletin 6510–D, 1957, 15 pp.

Vogler et al.: Chemical and Antibiotic Wastes Treatment, Sewage and Industrial Wastes, April 1952, vol. 24, pp. 485–495, pp. 489, 490 and 492–495 particularly relied on.

MORRIS O. WOLK, *Primary Examiner.*